Dec. 6, 1927.
J. F. SPEASE
1,651,844
SYSTEM OF ELECTRIC DISTRIBUTION
Filed Feb. 25, 1926
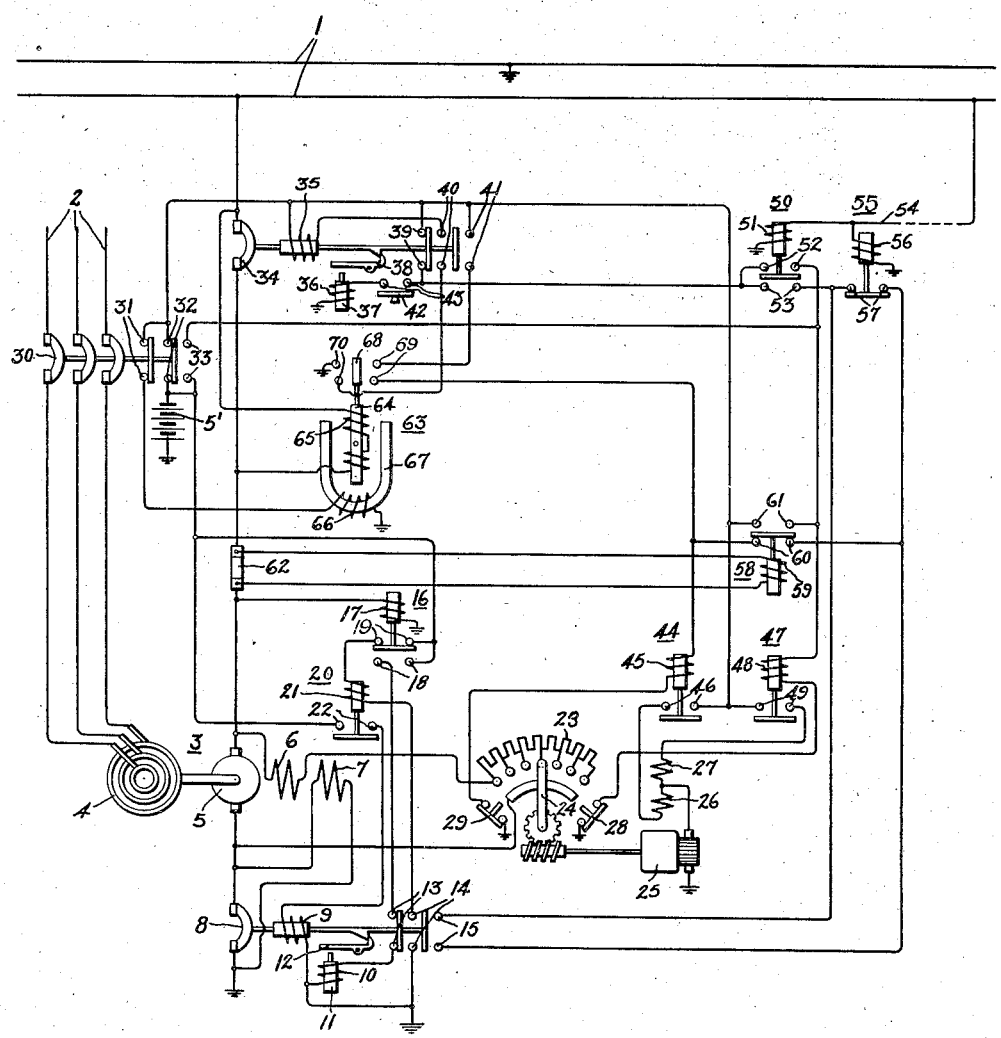
Inventor:
John F. Spease;
by *Alexander S. Lunt*
His Attorney.

Patented Dec. 6, 1927.

1,651,844

UNITED STATES PATENT OFFICE.

JOHN F. SPEASE, OF SCHENECTADY, NEW YORK, ASSIGNOR TO GENERAL ELECTRIC COMPANY, A CORPORATION OF NEW YORK.

SYSTEM OF ELECTRIC DISTRIBUTION.

Application filed February 25, 1926. Serial No. 90,677.

My invention relates to electrical distribution systems, and more particularly to systems comprising a supply circuit and a load circuit interconnected by dynamo-electric units.

The present invention is of particular utility in connection with a system of distribution which comprises an alternating current supply circuit and a direct current load circuit interconnected by a plurality of semi-automatically or automatically operated synchronous-motor-generator substations. In systems of this type automatic voltage regulating means are provided at each substation to increase or decrease the generator voltage depending on load demand so as to maintain the voltage constant at the load center. This load center may be at the station bus or at a predetermined point of some particular feeder of the load circuit. The pilot-wire circuit for the voltage regulating means is always exposed to the liability of a fault or breakage and if a fault or breakage actually occurs a false indication will be given of low voltage on the load circuit. The voltage of the generator will then be raised and may attain a value that will be destructive to the lights, motors, or other translating devices of the load circuit.

A protective arrangement comprising an undervoltage relay arranged to open the voltage regulating circuit on a fault or breakage of the voltage regulating pilot wire circuit has been used. Such a protective arrangement, when used in certain systems, prevents the voltage of the source from being increased automatically under certain conditions when it is desirable to increase the voltage of the source. For example, it is the practice in some systems to render the voltage regulating means operative to control the voltage of the source as soon as the source is connected to the system. The conditions of the system when the source is connected thereto may be such, however, that the system voltage is much lower than the pickup value of the undervoltage relay, so that this undervoltage relay prevents the source voltage from being increased to restore the system voltage to the normal value.

It is therefore an object of my invention to provide an improved arrangement of apparatus and circuits which will permit raising the generator voltage to a predetermined value independently of the operation of a protective arrangement for pilot-wire failure.

My invention will be better understood from the following description taken in connection with the accompanying drawing, in which the single figure is a diagrammatic representation of one embodiment of the invention, and its scope will be pointed out in the appended claims.

Referring to the drawing, a direct current distribution system, designated herein as a direct current load circuit, is indicated by conductors 1, and is interconnected with a supply circuit 2, shown as a three-phase alternating current line, by means of a substation, comprising a rotary transformer 3 and control equipment. The load circuit 1 and supply circuit 2 may be interconnected by a suitable number of substations; illustration of more than one being omitted from the drawing for the sake of simplicity and clearness. In the arrangement as illustrated, the rotary transformer 3 is shown as a motor-generator set comprising a synchronous motor 4 mechanically connected to, and here shown as mounted on the same shaft with, a direct current generator 5.

Generator 5 is designed to deliver substantially constant potential when it is operating under normal conditions. That is, if no unusual conditions occur on the load circuit the potential of the machine will not vary more than that due to the voltage drop in the line and machine which will be taken care of by the voltage regulating means described hereinafter. The excitation of the generator, however, is arranged so that if a short circuit occurs on the load circuit, or if conditions approaching such a short circuit occur, the voltage of the generator will decrease to such an amount that the generator will deliver a current which will be of a predetermined value. In order to provide for these conditions generator 5 is provided with field windings 6 and 7 normally opposing each other and arranged to produce under short circuit conditions only sufficient resultant ampere turns to overcome the internal voltage drop in the armature and connections of the machine when the machine is delivering the above-mentioned predetermined current.

Field winding 6 may be excited in any desirable manner by a convenient source of current but it is here shown as excited from the terminals of generator 5. The field winding 7 is arranged as a differential winding in series with the generator mains and is therefore excited in proportion to the current delivered by the generator but in a direction opposed to that of field winding 6. A means is thereby provided to limit the load on the generator. Since the full effect of the series field is not required during normal operation it may be arranged to be short circuited wholly or partially. I have shown a circuit breaker 8 for short circuiting the field winding 7.

The various circuits in the arrangement shown in the drawing are controlled by relays and auxiliary switches discussed in some detail in the following description. For simplicity of illustration the load circuit is shown with one side permanently connected to ground and hence a circuit for an operating coil of a relay which is connected to be responsive to generator or load circuit voltage is completed from the ungrounded side of the system through the coil to the ground; but it will be apparent that the invention is not limited to such a system. Such of the relay coils as require energization during periods when the generator voltage would not be of sufficient magnitude to furnish the required excitation are arranged to be energized from a suitable source of current shown as a battery 5'.

Automatic switching means may be used to control circuit breaker 8 which as shown is of the well-known latched-in type having a closing coil 9, which when energized, closes the circuit breaker, and an opening coil 10, which when energized moves a plunger 11 to disengage a latch 12 which is arranged to hold the circuit breaker closed in its circuit closing position. Circuit breaker 8 is also provided with auxiliary contacts 13 which are arranged to be closed when the circuit breaker is in the closed position and auxiliary contacts 14 and 15 which are arranged to be closed when the circuit breaker is in the open position. A relay 16 comprising an operating coil 17 which is connected to be responsive to the voltage of generator 5 is provided with contacts 18 in the energizing circuit of opening coil 10 of circuit breaker 8. Relay 16 is also provided with contacts 19 in the energizing circuit of relay 20 which is provided with an operating coil 21 and contacts 22 in the energizing circuit of closing coil 9 of circuit breaker 8. Relay 16 is arranged to close its contacts 18 and complete a circuit for opening coil 10 when the generator voltage is below a predetermined value and is arranged to close its contacts 19 when the generator voltage is above a predetermined value. With the closure of contacts 19 a circuit is completed for relay 20 which in turn closes its contacts 22 and completes a circuit for closing coil 9 of circuit breaker 8 when the circuit breaker is in the open position.

The voltage of generator 5 is controlled by means of an automatically operated rheostat 23 in the field circuit 6. Rheostat 23 is provided with a movable arm 24 which is operated to decrease or increase the resistance in the field circuit 6 by means of a pilot motor 25 arranged to rotate in one or the other direction depending upon the energization of its field windings 26 or 27. Limit switches 28 and 29 are provided to interrupt the operation of pilot motor 25 in order to prevent interruption of the field circuit 6 when the movable arm 24 reaches either of its extreme positions.

The synchronous motor 4 is arranged to be connected to the alternating supply lines 2 by any suitable means such as a circuit breaker 30 provided with auxiliary contacts 31, 32 and 33. Although shown as a manually operated circuit breaker, automatic switching means examples of which are well-known in the art may be used, but since they do not constitute a part of my invention, I deem it unnecessary to show such means in detail. Generator 5 is arranged to be connected to the direct current load circuit by an automatically operated switch which is shown as an automatically operated circuit breaker 34 provided with a closing coil 35, which when energized, closes the circuit breaker, and an opening coil 36, which when energized moves a plunger 37 to disengage a latch 38 which is arranged to hold the circuit breaker closed when it has moved to its circuit closing position. Circuit breaker 34 is also provided with auxiliary contacts 39 in the circuit of opening coil 36 which are arranged to be closed when the circuit breaker is closed, and auxiliary contacts 40 and 41 arranged to be closed when the circuit breaker is open. The auxiliary contacts 40 are in the circuit of closing coil 35 while contacts 41 are in the energizing circuit of a voltage raising relay to be presently described. A manually operated means shown as a push button 42 cooperating with contacts 43, in the circuit of the opening coil 36, is arranged to control the disconnection of circuit breaker 34.

An electroresponsive device 44, referred to herein as a voltage raising relay, is provided with an operating coil 45 energized from battery 5' and is arranged when energized to close its contacts 46 to complete a circuit for pilot motor 25 and its field winding 26. Under the influence of field winding 26 the pilot-motor 25 is arranged to operate in a direction to move the rheostat arm 24 to the left and thereby cut out resistance in the field circuit 6 of generator 5. A second electroresponsive device 47, referred to herein as a voltage lowering relay, is provided with an operating coil 48 energized from battery 5' and is arranged when energized to close its contacts 49 to complete a circuit for pilot-motor 25 and its field winding 27. Under the influence of field winding 27 the pilot-motor 25 is arranged to operate in a direction to move the rheostat arm 24 to the right and thereby insert resistance in the field circuit 6 of generator 5. A voltage regulating relay 50 comprising an operating coil 51 and contacts 52 and 53 is energized from the load circuit by means of a pilot-wire 54 which is arranged to be connected to the load circuit at such a point as to maintain a desired voltage at the load center. In order to protect against pilot-wire failure, a relay 55 comprising an operating coil 56 and contacts 57 is arranged to be energized in parallel with the voltage regulating relay 50 from the pilot-wire circuit 54. When the load circuit voltage is above a predetermined value contacts 52 of relay 50 are arranged to be closed and complete a break in the circuit for voltage lowering relay 47, and when the load circuit voltage is below a predetermined value contacts 53 of relay 50 are arranged to be closed and complete a break in the circuit for voltage raising relay 44. When the voltage impressed on relays 50 and 55 is below a predetermined value or pilot-wire 54 becomes broken, contacts 57 of protective relay 55 are arranged to open and introduce a break in the circuit for voltage raising relay 44. This does not necessarily interrupt the energizing circuit of relay 44 since auxiliary contacts 15 of circuit breaker 8 are connected in a shunt circuit around contact 57 and will be closed when circuit breaker 8 moves to the open position.

A direct-current load-regulating relay 58 provided with an operating coil 59 and contacts 60 and 61 is energized from a shunt 62 in series with the generator leads to the load circuit. When the current delivered by the generator is above a predetermined value relay 58 is arranged to close its contacts 61 in the circuit of voltage lowering relay 47 which is instrumental in checking the overload condition. Below the overload condition relay 58 is arranged to close its contacts 60 in the normal energizing circuit of voltage raising relay 44.

If generator 5 is to be connected to the direct current system, a means 63, referred to herein as a voltage-directional relay, is provided to measure the direction and amount of voltage difference between the generator and the load circuit. The voltage of generator 5 should be equal to or slightly higher than the line voltage before circuit breaker 34 is closed and the voltage-directional relay is connected and arranged so that when circuit breaker 34 is open the energizing circuit of closing coil 35 is prevented from being closed until the voltage of the generator exceeds the load circuit voltage. This voltage-directional relay may be of any suitable type and is shown as comprising an operating winding 65 surrounding a pivotally mounted armature 64 which is subjected to a magnetic field generated by a magnetizing winding 66 arranged about a core 67. The armature 64 is arranged to turn on its pivot in one direction or the other, depending upon the direction of current in the operating winding 65, and is provided with a contact 68 which is arranged to engage contacts 69 or 70 when the armature is moved in one or the other direction. As shown in the drawing, contacts 69 are connected in the energizing circuit of voltage raising relay 44 and are arranged to be closed when the load circuit voltage is higher than the generator voltage. Contacts 70 are connected in the closing coil circuit of circuit breaker 34 and are arranged to be closed when the generator voltage is slightly higher than the load circuit voltage. In order that the device 63 may operate in response to the relative potentials of generator 5 and load circuit 1 and thereby control the closing of circuit breaker 34, the operating winding 65 is connected in series with the generator and the load circuit, and the magnetizing winding 66 is arranged to be energized from the battery 5'.

The operation of the arrangement shown in the drawing is as follows: Assume that it is desired to connect generator 4 to the load circuit 1 under short-circuit conditions. At this time circuit breaker 30 in the alternating current supply line 2 is in the open position and has thereby opened its auxiliary contacts 31 and 32 and closed its auxiliary contacts 33. With contacts 31 and 32 open, all energizing circuits from the battery 5' will be interrupted except the energizing circuit for voltage-lowering relay 47. Assuming previous operation a circuit for voltage-lowering relay 47 will have been completed from battery 5' through contacts 33, coil 48 of relay 47, limit stop 28, to the ground. This permits pilot motor 25 to move the rheostat arm 24 to the extreme right on shutting down so as to insert all the resistance in the circuit of field winding 6. At the start, circuit breaker 34 in the direct current line is also in the open position and has thereby opened its auxiliary contacts 39 in the circuit of opening coil 36, closed its auxiliary contacts 40 in the circuit of closing coil 35, and closed its contacts 41 in the circuit of voltage raising relay 44. Circuit breaker 8 will have taken its open position so that its auxiliary contacts 13 in the circuit of its opening coil 10 are now open. Auxiliary contacts 14 in the circuit of relay 20 controlling the circuit of closing coil 9 are closed, and auxiliary contacts 15 in the circuit shunting contacts 57 of protective relay 55 are closed.

Synchronous motor 4 is connected to the alternating current supply lines 2 by closing circuit breaker 30 and is started and pulls into synchronism in a manner well known. Generator 5 being connected to synchronous motor 4 will come up to speed simultaneously therewith. Upon closure of alternating circuit breaker 30 its auxiliary contacts 31 and 32 close and complete a circuit for the magnetizing coil 66 of voltage directional relay 63 from battery 5', through contacts 32, contacts 31, coil 66 to the ground. When the voltage across the terminals of circuit breaker 34 is of the proper direction and of a value for which the relay is calibrated, contact 68 of relay 63 is arranged to move in a direction to engage contacts 70. Upon the closure of contacts 70 a circuit is completed for closing coil 35 of circuit breaker 34 from the battery 5', through contacts 32, coil 35, contacts 40, contacts 70 to the ground. Closing coil 35 now moves circuit breaker 34 to its circuit closing position where it engages holding latch 38. Simultaneously with the closure of circuit breaker 34 its contacts 40 are opened so as to interrupt the energizing circuit of closing coil 35.

During the initial period of energization, voltage regulating relay 50 will be subjected to a low voltage in view of the short-circuit conditions and will close its lower contacts 53 in the circuit of the voltage raising relay 44. The protective relay 55, which is arranged to open its contacts 57 in series with contacts 53 when the load circuit voltage is below a predetermined value, such as 15% to 20% of normal, will introduce a break in the circuit of the voltage raising relay 44. However, since circuit breaker 8 is arranged to remain in the open position until a predetermined generator voltage, such as 80% of normal, is attained, contacts 15 will close the shunt circuit around contacts 57. A circuit is thereby completed for voltage raising relay 44 from the battery 5', through contacts 32, contacts 39, contacts 53, contacts 15, contacts 60 of relay 58; coil 45 of relay 44, limit switch 29 to the ground. As soon as relay 44 is energized its contacts 46 close and complete a circuit for pilot-motor 25 and its field winding 26 from the battery 5', through contacts 32, contacts 46, field winding 26, the pilot-motor armature, to the ground. Under the influence of field winding 26, motor 25 is arranged to rotate in a direction to decrease the resistance 23 in the shunt field 6 of generator 5 and thereby increase the generator voltage. However, since circuit breaker 8 is in the open position the differential series field winding of generator 5 is not short-circuited. The generator voltage will not continue to increase if its current supply is above a predetermined value in view of the fact that the differential field is arranged to reduce the effective generator excitation so that above a predetermined current output generator 5 becomes substantially a constant current machine.

If the short circuit is burned off or the short-circuit condition is removed and the generator voltage reaches a predetermined value, such as 80% of normal, relay 16 which is energized from the generator will close its contacts 19 and complete a circuit for operating coil 21 of relay 20 from the battery 5', through contacts 19, coil 21, contacts 14, to the ground. Upon the energization of relay 20, its contacts 22 are closed and a circuit is completed for the closing coil 9 of circuit breaker 8 from the battery 5', contacts 22, coil 9, to the ground. Circuit breaker 8 now closes and engages latch 12 which holds it in the closed position to short-circuit the differential field winding 7. With the closure of circuit breaker 8, its contacts 14 are opened so as to effect the deenergization of relay 20 which opens its contacts 22 to interrupt the circuit of closing coil 9. At the same time contacts 15 are opened to interrupt the shunt circuit around contacts 57 of the protective relay 55. If the pilot wire 54 is not broken, relay 55, which is arranged to close contacts 57 at a voltage below the voltage at which circuit breaker 8 is closed will have operated to close contacts 57 before contacts 15 are opened.

The above sequence of operations provides for a voltage raising circuit below a predetermined voltage, such as 80% of normal, and protects against pilot-wire failure or false indication of load circuit voltage above the predetermined value of generator voltage, since contacts 57 are no longer short-circuited above this value and relay 55 may now operate to open the circuit for voltage raising relay 44.

Assuming that the voltage of load circuit 1 has now reached its normal value, the regulating relays will operate in the following manner to maintain a certain predetermined voltage at the load center. Voltage regulating relay 50 is arranged to close its lower contacts 53 when the voltage of the load circuit is below a predetermined value and operates to effect an increase in the voltage of generator 5 as previously explained. Should the load circuit voltage be too high, relay 50 closes its upper contacts 52 and completes a circuit to energize relay 47. A circuit is now established from battery 5', through contacts 32, contacts 39, contacts 52, coil 48 of relay 47, limit switch 28, to the ground. When relay 47 is energized, its contacts 49 are closed and a circuit is completed for the pilot-motor 25 from the battery 5', through contacts 32, contacts 49, field winding 27, the pilot-motor armature, to the ground. Under the influence of field winding 27, motor 25 is arranged to rotate in a direction to increase the resistance 23 in the shunt field circuit of generator 5 and thereby decrease the generator voltage. This automatic voltage regulation is carried out in accordance with predetermined conditions and normal running conditions will now obtain.

In case the generator delivers more than a predetermined current, relay 58, which is energized from the shunt 62 in the generator line, will close its contacts 61 and provide a circuit for the voltage lowering relay 47 independently of the position of voltage regulating relay 50 from the battery 5', through contacts 32, contacts 61, operating coil 48 of relay 47, limit switch 28, to the ground. Upon energization of relay 47 a circuit will be completed for the pilot-motor armature and its field winding 27 to increase the resistance in field circuit 6 of generator 5 in a manner previously described and thereby decrease the generator voltage. It will also be observed that contacts 60 are opened when contacts 61 are closed and thus prevent raising of the generator voltage during the overload condition.

In case it is desirable to connect the generator and equipment shown to a load circuit which is energized substantially at normal voltage, a similar sequence of operations as previously described will be necessitated. In this case, so long as the system voltage is higher than the generator voltage, contact 68 of voltage directional relay 63 will be arranged to close contacts 69. Since it is assumed the direct-current circuit breaker 34 is in the open position, its auxiliary contacts 41 will be closed and a circuit will be completed for voltage raising relay 44 from the battery 5', through contacts 32, contacts 41, contacts 69, coil 45 of relay 44, limit switch 29, to the ground. As soon as relay 44 picks up, its contacts 46 close to establish a circuit for pilot-motor 25 from the battery 5', through contacts 32, contacts 46, field winding 26, the pilot-motor armature, to the ground. Under the influence of field winding 26, motor 25 is arranged to rotate in a direction to decrease the resistance 23 and thereby increase the excitation of generator 5 to increase its voltage until the generator voltage is slightly higher than the system voltage. Voltage directional relay 63 will then operate to close its contacts 70 and circuit breaker 34 will be closed to connect generator 5 to the system as previously described.

Assuming that the system and the generator shown is in normal operation and the pilot wire 54 becomes broken or is subjected to a fault, the voltage impressed on relay 50 will be zero or some untrue value of the load circuit voltage. Relay 50 will then operate to close its contacts 53 and would effect an increase in the generator voltage except for the operation of the relay 55 which is subjected to the same voltage or lack of voltage and arranged under these conditions to open its contacts 57 in series with contacts 53 of relay 50. When contacts 57 are opened a break is introduced in the energizing circuit for the voltage raising relay 44 and it is now impossible to raise the generator voltage by means of the automatically operated rheostat 23, unless the system voltage falls to a certain predetermined value low enough to cause relay 16 to close its lower contacts. In this event, its contacts 18 are closed and a circuit is completed for the opening coil 10 of circuit breaker 8 from battery 5', through contacts 18, contacts 13, coil 10, to the ground. Upon the energization of opening coil 10, plunger 11 is arranged to disengage latch 12 of circuit breaker 8, which moves to its open position and closes contacts 15 in the shunt circuit around contacts 57. Voltage raising may now be established irrespectively of the operation of protective relay 55 and effect an increase in the voltage of generator 5, in a manner previously described.

If it is desired to disconnect generator 5 from the load circuit 1, push button 42, or any other convenient means, will be operated to engage contacts 43 and thereby complete the energizing circuit of opening coil 36 of circuit breaker 34. When energized coil 36 is arranged to move plunger 37 to disengage latch 38 and circuit breaker 34 moves to the open position thereby opening contacts 39 in the circuit of battery 5', closing contacts 40 in its closing coil circuit, and closing contacts 41 in the circuit of contacts 69 of the voltage-directional relay 63. The alternating current circuit breaker 30 must also be opened substantially simultaneously with circuit breaker 34. The substation will then be shut down and will be in a condition to be connected to the load circuit whether the load circuit is to be energized under short-circuit conditions by this particular substation or whether it is to be energized in conjunction with other substations in operation on the system.

While I have shown and described a particular embodiment of my invention, it will be obvious to those skilled in the art that changes and modifications may be made without departing from the invention and I, therefore, aim in the appended claims to cover all such changes and modifications as fall within the true spirit and scope of my invention.

What I claim as new and desire to secure by Letters Patent of the United States, is:

1. In a system of distribution, an electric circuit, a source of current connected to said circuit, regulating means for said source responsive to an electrical condition of said circuit, control means cooperating with said regulating means for effecting a change in an electrical condition of said source when the electrical condition of said circuit is above a predetermined value, and means controlled by the electrical condition of said source for effecting the operation of said regulating means to produce a change in the electrical condition of said source irrespectively of the operation of said control means.

2. In a system of distribution, an electric circuit, a source of current connected to said circuit, means responsive to an electrical condition of said circuit normally arranged to effect a change in the voltage of said source when the electrical condition of said circuit departs from a predetermined value, means normally arranged to prevent a change in the voltage of said source when the energization of said first mentioned means is below a predetermined value, and means for effecting a change in the voltage of said source irrespectively of the operation of said second mentioned means when the electrical condition of said circuit is below a predetermined value.

3. In a system of distribution, an electric circuit, a source of current arranged to be connected to said circuit, means responsive to the voltage of said circuit normally arranged to effect a change in the voltage of said source when the voltage of said circuit departs from a predetermined value, means normally arranged to prevent said first mentioned means from effecting an increase in the voltage of said source when the voltage applied to said first mentioned means is below a predetermined value, and means for permitting said first mentioned means to effect an increase in the voltage of said source irrespectively of the operation of said second mentioned means when said circuit is to be energized under short circuit conditions by said source.

4. In a system of distribution, a load circuit, a dynamo-electric machine arranged to be connected to said load circuit, said load circuit presenting short circuit conditions for said dynamo-electric machine when it alone supplies current thereto, regulating means responsive to the voltage of said load circuit normally arranged to control the excitation of said dynamo-electric machine to maintain constant the voltage of said load circuit, means responsive to the voltage impressed upon said regulating means normally arranged for rendering said regulating means inoperative to increase the voltage of said dynamo-electric machine when the voltage impressed on said regulating means is below a predetermined value, and means for permitting the operation of said means to increase the voltage of said dynamo-electric machine irrespectively of the operation of said second mentioned means when said dynamo-electric machine is alone connected to said load circuit.

5. In a system of distribution, a direct current circuit, a generator connected to said circuit, electroresponsive means arranged to effect an increase in the excitation of said generator, electroresponsive means arranged to effect a decrease in the excitation of said generator, a relay responsive to the voltage of said circuit for controlling the operation of said electroresponsive means, a relay normally arranged to prevent the operation of said first mentioned electroresponsive means when the voltage impressed upon said first mentioned relay is below a predetermined value, and means for permitting the operation of said first mentioned electroresponsive means irrespectively of the operation of said second mentioned relay when the voltage of said direct current circuit is below a predetermined value.

6. In a system of distribution, an electric circuit, a source of energy for supplying current to said circuit, said source being arranged to supply current at a reduced voltage under abnormal load conditions on said electric circuit, regulating means for said source comprising a control relay, a control circuit for connecting said relay across said electric circuit, means responsive to a failure of said control circuit for removing the control of said regulating means from the control of said control relay, and means responsive to the voltage of said source for effecting the operation of said regulating means irrespectively of the operation of said failure responsive means.

7. A system of electrical distribution comprising a line circuit subject to short circuit conditions, a dynamo-electric machine arranged to supply current to said line circuit, said machine being provided with field windings, one portion of said windings being in series with said line circuit and connected normally to oppose another portion excited across the terminals of said machine, means responsive to the voltage of the line circuit for varying the excitation supplied by said other portion of the field winding, means for reducing normally the excitation of said first portion and for restoring the excitation of all of said first portion when the voltage of said machine is below a predetermined value, means arranged normally to render inoperative the effect of said first mentioned means when the energizing circuit for said first mentioned means fails, and means operating substantially simultaneously with said second mentioned means when restoring the full effect of said series field winding for permitting an increase in the excitation of said other portion of the field winding irrespectively of the operation of said third mentioned means when the voltage of said line circuit is below a predetermined value.

8. In a system of distribution, an electric circuit, a generator connected to said circuit and normally arranged to supply current thereto, an excitation circuit for said generator comprising a shunt field winding and a series field winding, electroresponsive means for cutting out said series field when the voltage of said generator is above a predetermined value, means for controlling the excitation of said shunt field circuit responsive to the voltage of said electric circuit and tending to maintain constant the voltage of said electric circuit, a protective relay normally arranged to render said excitation varying means inoperative to increase the voltage of said generator when the voltage applied to said excitation controlling means is below a predetermined value, and means associated with said electroresponsive means to increase the voltage of said generator independently of the operation of said protective relay when the voltage of said electric circuit is below a predetermined value.

9. In a system of distribution, an electric circuit, a source of current arranged to be connected to said circuit, means responsive to the relative voltages of said source and circuit for connecting said source to said circuit, regulating means for said source responsive to the voltage of said circuit, control means responsive to the voltage of said circuit cooperating with said regulating means for effecting a change in the voltage of said source when the voltage of said circuit is above a predetermined value, means responsive to the magnitude of the current flow through said source for decreasing the voltage of said source independently of said control means when the current flow of said source is above a predetermined value and for increasing the voltage of said source in cooperation with said regulating means and said control means when the current flow of said source is below a predetermined value, and means controlled by the voltage of said source for effecting the operation of said regulating means to effect a change in the voltage of said source irrespectively of the operation of said control means.

In witness whereof, I have hereunto set my hand this 24th day of February, 1926.

JOHN F. SPEASE.